United States Patent
Delgado et al.

(10) Patent No.: US 11,345,198 B2
(45) Date of Patent: May 31, 2022

(54) RIDE VEHICLE CONNECTION SYSTEMS AND METHODS

(71) Applicant: Universal City Studios LLC, Universal City, CA (US)

(72) Inventors: Nicholas Alexander Delgado, Orlando, FL (US); Vanessa Elizabeth Nuñez Osorio, Doral, FL (US); Christopher André Phillips, Plantation, FL (US); Ryan Ramong Morrison, Miramar, FL (US)

(73) Assignee: Universal City Studios LLC, Universal City, CA (US)

( * ) Notice: Subject to any disclaimer, the term of this patent is extended or adjusted under 35 U.S.C. 154(b) by 358 days.

(21) Appl. No.: 16/421,206

(22) Filed: May 23, 2019

(65) Prior Publication Data

US 2020/0317008 A1    Oct. 8, 2020

Related U.S. Application Data

(60) Provisional application No. 62/830,862, filed on Apr. 8, 2019.

(51) Int. Cl.
  *B60D 1/04*    (2006.01)
  *B60D 1/24*    (2006.01)
  *A63G 21/04*   (2006.01)

(52) U.S. Cl.
  CPC .............. *B60D 1/04* (2013.01); *B60D 1/246* (2013.01); *A63G 21/04* (2013.01)

(58) Field of Classification Search
  CPC . B60D 1/04; B60D 1/246; B60D 1/14; B60D 1/481; A63G 21/04
  See application file for complete search history.

(56) References Cited

U.S. PATENT DOCUMENTS

| | | | |
|---|---|---|---|
| 743,169 A | 11/1903 | Jackman | |
| 4,664,403 A * | 5/1987 | Livingston | B60D 1/06 280/460.1 |
| 5,355,971 A * | 10/1994 | Austin | A01B 71/066 180/53.1 |
| 6,203,049 B1 * | 3/2001 | Gibson | A01B 59/042 280/494 |
| 6,484,083 B1 * | 11/2002 | Hayward | B60D 1/00 180/24.05 |

(Continued)

Primary Examiner — Minnah L Seoh
Assistant Examiner — Michael R Stabley
(74) Attorney, Agent, or Firm — Fletcher Yoder P.C.

(57) ABSTRACT

A vehicle connection system in accordance with present embodiments includes a first connection mechanism having a shaft with a first portion coupled to a second portion by a hinged joint. A locking element extends from the second portion. Guides extend on opposing sides of the second portion such that a channel is formed between the guides and the guides block movement of the second portion about the hinged joint outside of the channel. The guides are positioned between the locking element and the hinged joint along the shaft. A second connection mechanism is configured to couple with the first connection mechanism and includes a locking box configured to receive the locking element via an aperture in the locking box and configured such that rotation of the locking element while in the locking box via rotation of the shaft interlocks the locking element with the lock box.

20 Claims, 8 Drawing Sheets

(56) References Cited

U.S. PATENT DOCUMENTS

| | | | |
|---|---|---|---|
| 6,877,758 B2* | 4/2005 | Colistro | B60D 1/075 |
| | | | 180/14.4 |
| 6,880,651 B2* | 4/2005 | Loh | B62D 12/00 |
| | | | 180/14.2 |
| 8,118,323 B2* | 2/2012 | Hudson | B60D 1/00 |
| | | | 280/494 |
| 9,193,231 B2* | 11/2015 | Bergum | B60D 1/167 |
| 9,403,566 B2* | 8/2016 | Jacobsen | B62D 55/0655 |
| 9,610,510 B2 | 4/2017 | Comploi | |
| 9,919,753 B2* | 3/2018 | Jacobsen | B62D 37/04 |
| 10,029,748 B2* | 7/2018 | Hellholm | B62D 11/20 |
| 10,059,159 B2* | 8/2018 | Law | B60D 1/14 |
| 10,086,299 B2 | 10/2018 | Boyle | |
| 10,195,913 B2* | 2/2019 | Thompson | A01B 59/042 |
| 2017/0246924 A1* | 8/2017 | Thompson | B60D 1/141 |

* cited by examiner

RIDE VEHICLE CONNECTION SYSTEMS AND METHODS

CROSS REFERENCE TO RELATED APPLICATIONS

This application claims the benefit of U.S. Provisional Application Ser. No. 62/830,862, entitled "RIDE VEHICLE CONNECTION SYSTEMS AND METHODS," filed Apr. 8, 2019, which is hereby incorporated by reference in its entirety for all purposes.

BACKGROUND

The present disclosure relates generally to the field of amusement parks. More specifically, embodiments of the present disclosure relate to methods and equipment used in conjunction with amusement park rides.

This section is intended to introduce the reader to various aspects of art that may be related to various aspects of the present disclosure, which are described below. This discussion is believed to be helpful in providing the reader with background information to facilitate a better understanding of the various aspects of the present disclosure. Accordingly, it should be understood that these statements are to be read in this light, and not as admissions of prior art.

Since the early twentieth century, amusement parks (or theme parks) have substantially grown in popularity. Certain amusement park rides may include a set of ride vehicles coupled together and confined to travel along a singular path in a train format. However, such amusement park rides provide limited and repetitive experiences to passengers.

SUMMARY

Certain embodiments commensurate in scope with the originally claimed subject matter are summarized below. These embodiments are not intended to limit the scope of the disclosure, but rather these embodiments are intended only to provide a brief summary of certain disclosed embodiments. Indeed, the present disclosure may encompass a variety of forms that may be similar to or different from the embodiments set forth below.

A vehicle connection system in accordance with present embodiments includes a first connection mechanism having a shaft with a first shaft portion coupled to a second shaft portion by a hinged joint. A locking element extends from the second shaft portion. Guides extend on opposing sides of the second shaft portion such that a channel is formed between the guides and the guides block movement of the second shaft portion about the hinged joint outside of the channel. The guides are positioned between the locking element and the hinged joint along a length of the shaft. A second connection mechanism is configured to couple with the first connection mechanism. The second connection mechanism includes a locking box configured to receive the locking element via an aperture in the locking box and configured such that rotation of the locking element while in the locking box via rotation of the shaft interlocks the locking element with the lock box.

A vehicle connection system in accordance with present embodiments includes a first connection mechanism having a locking box configured to engage a first locking element of a second connection mechanism. A roll shaft of the first connection mechanism is coupled to the locking box via a hinged joint. The roll shaft is configured to rotate relative to a roll shaft support configured to support the roll shaft. An engager is configured to be actuated to engage an extension from the roll shaft to block rotation of the roll shaft. An actuator is configured to extend a second locking element into engagement with the locking box to resist rotation of the locking box about the hinge joint.

A system in accordance with present embodiments includes a first connector coupled to a first vehicle and a locking element extending from a shaft. A first portion of the shaft is coupled to a second portion of the shaft about a first hinged joint. The shaft is configured to axially rotate. A second connector is coupled to a second vehicle and includes a locking box configured to receive the locking element and interlock with the locking element upon rotation of the locking element, a second hinged joint, and a roll shaft coupled to the locking box via the second hinged joint.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

The present disclosure provides, among other things, embodiments of a ride system having ride vehicles that are configured to couple together (e.g., engage) and decouple from each other (e.g., disengage) during a ride cycle. Generally, amusement parks may include attractions having a set of ride vehicles coupled together in a serial formation (e.g., a train format) and configured to move along a singular or common path in unison. To this end, each ride cycle or lap along the path may provide a substantially similar experience to each ride vehicle and passenger, thereby providing a limited and repetitive experience for passengers. Further, such amusement park attractions may be difficult to maintain, as decoupling the ride vehicles from each other for maintenance may require excessive time and effort. Accordingly, provided herein is a connection system for a ride attraction configured to provide automated coupling and decoupling between ride vehicles. As such, a ride attraction may include multiple conjoined paths that ride vehicles may separately travel along during a ride cycle. To illustrate, at a start of a ride cycle, a set of ride vehicles may be coupled together in a serial formation via respective connection systems disposed therebetween. As the ride cycle progresses, the set of ride vehicles may decouple from one another such that individual ride vehicles of the set of ride vehicles may move along individual and separate paths to create unique riding experiences between ride cycles and passengers.

For example, the connection system may include a first connection mechanism coupled to a front of a first ride vehicle and a second connection mechanism coupled to a rear of a second ride vehicle. The first connection mechanism is configured to be coupled to the second connection mechanism during certain portions of the ride cycle and be decoupled from the second connection mechanism during other portions of the ride cycle. As such, throughout a ride cycle, ride vehicles may separate and conjoin multiple times to allow the ride vehicles to travel along separate portions of the path during a single ride cycle.

Figure 1:
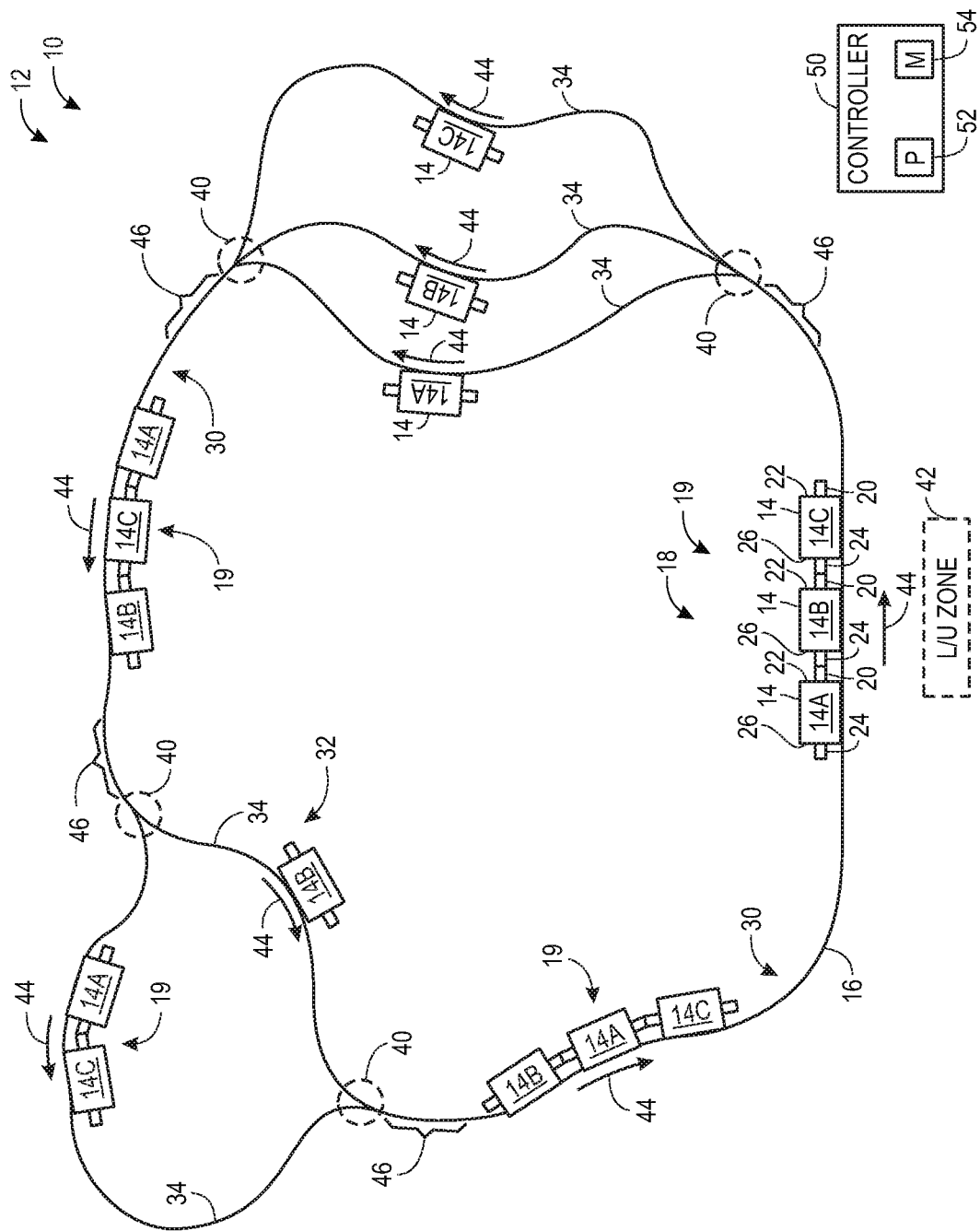
FIG. 1 is an schematic view of an embodiment of a ride system, in accordance with the present disclosure.

With the foregoing in mind, FIG. 1 illustrates a ride system 10 (e.g., amusement park attraction) of an amusement park 12. The ride system 10 includes multiple ride vehicles 14 configured to move along a path 16 of the ride system 10. The path 16 may be any suitable path along which the ride vehicles 14 move. Each ride vehicle 14 may couple to each other via a connection system 18. The connection system 18 includes a first connection mechanism 20 coupled to a front 22 of each ride vehicle 14 and a second connection mechanism 24 coupled to a rear 26 of each ride vehicle 14. As discussed herein, the connection system 18 is configured to couple the ride vehicles 14 together such that the ride vehicles 14 may move in unison along portions of the path 16. The connection system 18 is further configured to decouple the ride vehicles 14 from each other such that the ride vehicles 14 may travel individually along separate portions of the path 16. The currently illustrated embodiment shows three ride vehicles 14 at various positions along the path 16. However, it should be understood that the ride system 10 may include any suitable number of ride vehicles 14. Particularly, the three individual ride vehicles 14 may be referred to herein as a first ride vehicle 14a, a second ride vehicle 14b, and a third ride vehicle 14c. When the ride vehicles 14 are coupled together via the connection system 18, the ride vehicles may form a train 19.

As shown, the path 16 may include one or more primary portions 30 and one or more secondary portions 32. The primary portions 30 of the path 16 may be defined by portions of the path 16 along which each ride vehicle 14 (e.g., the train 19) is directed to travel while coupled together during each ride cycle of the ride system 10. The secondary portions 32 of the path 16 may be defined by portions of the path 16 along which individual ride vehicles 14 may possibly be directed to travel during a given ride cycle. For example, the secondary portions 32 of the path 16 may be characterized by having multiple separate routes 34 along which the ride vehicles 14 may optionally travel. While traveling along the separate routes 34 of the secondary portions 32 of the path 16, the ride vehicles 14 may travel individually, such that the ride vehicles 14 may not be coupled to other ride vehicles 14 via the connection system 18. In some embodiments, while traveling along the separate routes 34 of the secondary portions 32 of the path 16, the ride vehicles 14 may travel in the format of the train 19, such as having more than one of the ride vehicles 14 coupled together via the connection system 18.

The secondary portions 32 of the path 16 may include two or more of the separate routes 34 along which the ride vehicles 14 may travel. In this manner, every ride vehicle 14 may travel along the primary portions 30 of the path 16 during each ride cycle and may travel along only one of the separate routes 34 of each of the secondary portions 32 of the path 16. In some embodiments, the path 16 may include one or more track switches 40 configured to direct the ride vehicles 14 to the separate routes 34 from the primary portions 30. The one or more track switches 40 may also be configured to direct ride vehicles 14 from the separate routes 34 of the secondary portions 32 to the primary portions 30.

The path 16 may further include a loading/unloading zone 42. At a start of a ride cycle, passengers may board (e.g., load into) the ride vehicles 14 from the loading/unloading zone 42. In some embodiments, the ride vehicles 14 may be stopped or may be moving slowly along the path 16 adjacent to the loading/unloading zone 42 to allow the passengers to board the ride vehicles 14. Further, as shown, the ride vehicles 14 may be coupled together (e.g., via the connection systems 18) in the format of the train 19 while the passengers board the ride vehicles 14 from the loading/unloading zone 42. In this way, the passengers may be unaware of the separation capabilities (e.g., decoupling via the connection systems 18) of the ride vehicles 14 prior to boarding the ride vehicles 14, thereby allowing the passengers to be surprised when the ride vehicles 14 decouple, thus enhancing a riding experience for the passengers.

Once the passengers are loaded into the ride vehicles 14, the ride cycle may continue as the ride vehicles 14 move along the path 16 in the direction indicated by arrows 44. The ride vehicles 14 may travel along one of the primary portions 30 of the path 16 from the loading/unloading zone 42 toward one of the secondary portions 32. Prior to reaching one of the secondary portions 32, the ride vehicles 14 may come to a stop along the path 16. For example, the ride vehicles 14 may come to a stop at a block 46 (e.g., a stopping section) of the path 16. In some embodiments, the block 46 may include a substantially flat portion of the path 16. In some embodiments, the path 16 may include blocks 46 directly prior to and directly after the secondary portions 32 of the path 16, relative to the direction of travel. In some embodiments, the blocks 46 may be located at any suitable section along the path 16.

Particularly, in some embodiments, brakes of the ride vehicles 14 and/or of the path 16 (e.g., depending on a type of the path 16) may engage to stop movement of the ride vehicles 14 within one of the blocks 46 of the path 16. As described in further detail below, once the ride vehicles 14 have come to a stop in front of (e.g., prior to reaching) the secondary portion 32 in the block 46, the connections systems 18 of the ride vehicles 14 may cause the ride vehicles 14 to decouple or disengage from each other. For example, the second connection mechanism 24 of the first ride vehicle 14a may disengage from the first connection mechanism 20 of the second ride vehicle 14b, the second connection mechanism 24 of the second ride vehicle 14b may disengage from the second connection mechanism 24 of the third ride vehicle 14c, and so forth. Indeed, as mentioned above, it should be understood that the ride system 10 may include any suitable number of ride vehicles 14 coupled together in the a train format, such as that of the train 19.

Once the ride vehicles 14 are decoupled from each other, each of the ride vehicles 14 may individually (or as a train) travel along one of the separate routes 34 of the secondary portion 32 of the path 16. For example, from the block 46, the ride vehicle 14 from a front of the train 19 (e.g., relative to the direction of travel 44) may proceed along one of the separate routes 34 while other ride vehicles 14 of the train 19 remain stationary in the block 46. Once the ride vehicle 14 from the front of the train 19 departs from the block 46, the preceding ride vehicle 14 of the train 19 may depart from the block 46, and so forth. In other words, departure of the ride vehicles 14 from the block 46 may be staggered. In this way, the ride vehicles 14 may be spaced apart while traveling disconnected from each other.

In some embodiments, the separate routes 34 may include respective lengths and/or the ride vehicles 14 may travel along the separate routes 34 of the secondary portion 32 at different speeds. To this end, after traversing through the secondary portion 32, the ride vehicles 14 may arrive at the primary portion 30 (e.g., at one of the blocks 46 after the secondary portion 32) in a different order relative to their order prior to the secondary portion 32.

In some embodiments, after each ride vehicle 14 traverses one of the separate routes 34, the ride vehicles 14 may come to a stop at one of the blocks 46 disposed after the secondary portion 32, relative to the direction of travel 44. For example, the first ride vehicle 14 to arrive at the block 46 may come to a stop at the block 46, the next ride vehicle 14 to arrive at the block 46 may come to a stop at the block 46 and couple to the first ride vehicle 14 already stationed at the block 46, and so forth until the train 19 has reformed with all of the ride vehicles 14. In some embodiments, the ride system 10 may include one or more ride vehicles 14 without passengers that may be coupled to and decoupled from the train 19 at the blocks 46. For example, such ride vehicles 14 may include a special effect platform configured to enable special effects, a carrier for an actor/actress, a vehicle support for an animated object, an unoccupied vehicle, and/or other variations, to enhance an experience for passengers by having an unexpected vehicle 14 engage with the train 19.

This process may continue throughout the ride cycle as the ride vehicles 14 travel through primary portions 30 and secondary portions 32 of the path 16 until the ride vehicles 14 reach the loading/unloading zone 42 at the end of the ride cycle. The passengers may then unload from the ride vehicles 14 at the loading/unloading zone 42 and new passengers may load into the ride vehicles 14 to start a new ride cycle. Further, it should be noted that the currently illustrated embodiments of the ride system 10 have been simplified to focus on certain aspects of the disclosure as discussed herein. Indeed, although not shown, the ride system 10 may include additional features, such as, but not limited to, augmented reality systems, virtual reality systems, special effect systems, animatronic systems, and so forth.

As discussed herein, operations of the ride system 10 may be controlled utilizing an attraction controller 50. The controller 50 may be any device employing a processor 52 (which may represent one or more processors), such as an application-specific processor. The controller 50 may also include a memory device 54 storing instructions executable by the processor 52 to perform methods and control actions described herein relating to the ride system 10. The processor 52 may include one or more processing devices, and the memory device 54 may include one or more tangible, non-transitory, machine-readable media. By way of example, such machine-readable media can include RAM, ROM, EPROM, EEPROM, CD-ROM, or other optical disk storage, magnetic disk storage or other magnetic storage devices, or any other medium which can be used to carry or store desired program code in the form of machine-executable instructions or data structures and which can be accessed by the processor 52 or by any general purpose or special purpose computer or other machine with a processor. For example, as discussed in further detail below, the attraction controller 50 may be utilized to enable engagement and ensure engagement between the first connection mechanism 20 and the second connection mechanism 24 of the connection system 18, control a speed of the ride vehicles 14 along the path 16, and control other various aspects of the ride system 10. For example, the attraction controller 50 may also monitor and control aspects relating to timing of the ride vehicles 14 as the ride vehicles 14 progress through the ride system 10.

Figure 2:
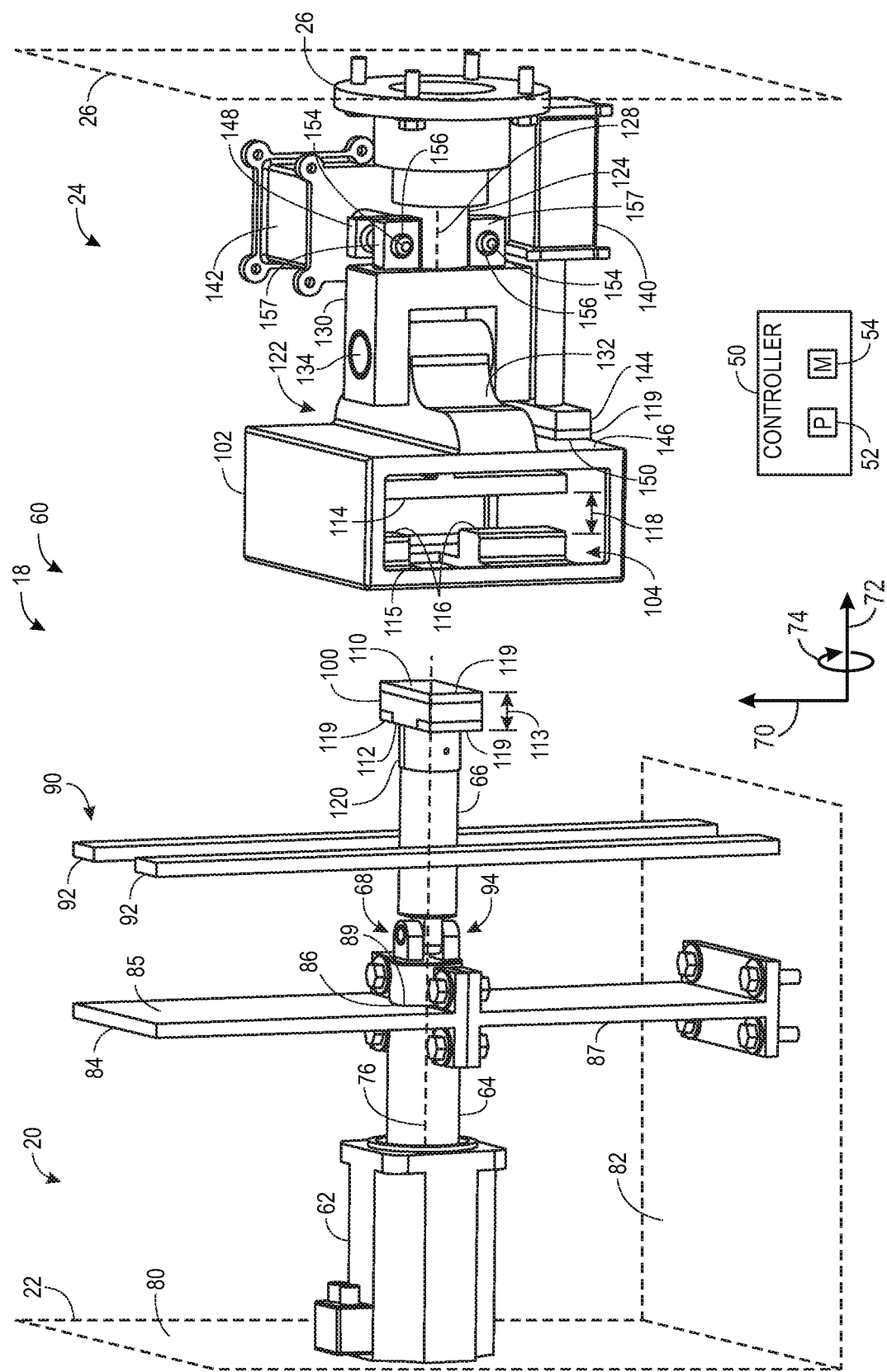
FIG. 2 is a perspective view of an embodiment of a connection system of the ride attraction of FIG. 1, in accordance with the present disclosure.

Keeping this in mind, FIG. 2 is a perspective view of one of the connection systems 18 in a disengaged configuration 60. As discussed above, each connection system 18 may include the first connection mechanism 20 coupled to the front 22 of one of the ride vehicles 14 and the second connection mechanism 24 coupled to the rear 26 of a different, adjacent ride vehicle 14. While the embodiments discussed herein may include the first connection mechanism 20 coupled to the front 22 of the ride vehicle 14 and the second connection mechanism 24 coupled to the rear 26 of the ride vehicle 14, it should be understood that in some embodiments, the second connection mechanism 24 may be coupled to the front 22 of the ride vehicle 14 and the first connection mechanism 20 may be coupled to the rear 26 of the ride vehicle 14. As shown, while in the disengaged configuration 60, the first connection mechanism 20 may be disengaged (e.g., unlocked, separated) from the second connection mechanism 24. As discussed in further detail below with reference to FIG. 3, the first connection mechanism 20 may be engaged (e.g., locked) with the second connection mechanism 24 while in an engaged configuration 61. Moreover, as will be appreciated, the connection system 18 may include one or more joints configured to provide relative movement (e.g., pitch, roll, yaw) between the ride vehicles 14 having the connection system 18. While in the disengaged configuration 60 (e.g., when the ride vehicles 14 are not coupled together), the one or more joints may be locked (e.g., immobilized) to prevent extraneous movement of the connection system 18. However, while in the engaged configuration 61, such as when the ride vehicles 14 are coupled together, the one or more joints may be unlocked (e.g., mobilized) to allow the relative movement between the ride vehicles 14.

As shown, the first connection mechanism 20 may include a servo motor 62 (e.g., a rotational actuator, a hydraulic actuator, an electromechanical actuator). The servo motor 62 is coupled to a servo motor shaft 64. The servo motor 62 may be any suitable actuator configured to rotate the servo motor shaft 64 based on one or more signals received from the controller 50. The servo motor shaft 64 is further coupled to a locking shaft 66 via a first clevis joint 68 (e.g., a hinge, a pitch joint). That is, the first connection mechanism 20 may include a first shaft portion (e.g., the servo motor shaft 64) and a second shaft portion (e.g., the locking shaft 66) coupled together via a hinged joint (e.g., the first clevis joint 68). Further, throughout the description herein, a set of reference directions may be utilized, including a vertical direction 70, a horizontal direction 72, and a rotational direction 74. Unless otherwise specified, the horizontal direction 72 may be collinear with a longitudinal axis 76 of the servo motor shaft 64, the rotational direction 74 may refer to rotation about the longitudinal axis 76 of the servo motor shaft 64, and the vertical direction 70 may be perpendicular to the horizontal direction 72. In some embodiments, the vertical direction 70 may further define a vertical 70 plane, which may be disposed orthogonal to the horizontal direction 72. Further, the horizontal direction 72 may further define a horizontal 72 plane, which may be disposed orthogonal to the vertical direction 70. As will be appreciated, the servo motor 62 may rotate 74 the servo motor shaft 64 and the locking shaft 66 approximately ninety degrees about the longitudinal axis 76 to provide locking (e.g., engagement) or unlocking (e.g., disengagement) of the connection system 18.

In some embodiments, the front 22 of the ride vehicle 14 may include a first front surface 80 and a second front surface 82. The first front surface 80 and the second front surface 82 may be disposed substantially perpendicular relative to each other. The first front surface 80 may be substantially vertical 70 and the second front surface 82 may be substantially horizontal 72. In some embodiments, the first front surface 80 and the second front surface 82 may be disposed at any suitable respective orientations and may include any suitable angle disposed therebetween. Keeping this in mind, the servo motor 62 may be mounted to the first front surface 80, and the servo motor shaft 64 may extend in the horizontal direction 72 from the first front surface 80 along the longitudinal axis 76. The first connection mechanism 20 may further include a support structure 84 coupled at least to the second front surface 82. The support structure 84 is also coupled to the servo motor shaft 64. The support structure 84 may provide direct support to the servo motor shaft 64 in the vertical 70 and the horizontal 72 directions. Particularly, the support structure 84 may be coupled to an annular support guide 86 of the servo motor shaft 64 to provide support to the servo motor shaft 64, as discussed in further detail below with reference to FIG. 4. In some embodiments, the support structure 84 may include a first portion 85 and a second portion 87 coupled together about the annular support guide 86 of the servo motor shaft 64. For example, the first portion 85 and the second portion 87 may be coupled together via fasteners 88, or with any other suitable connection system. An interface formed between the first and second portions 85, 87 of the support structure 84 may include an aperture 89 configured to be disposed about the annular support guide 86 of the servo motor shaft 64.

The first connection system 20 may further include a pair of guide plates 90. The guide plates 90 may be coupled to and extend at least partially vertically 70 from the second front surface 82. Both guide plates 90 may include a respective lateral surface 92 facing towards the locking shaft 66 and positioned adjacent to the locking shaft 66. In some embodiments, one or both of the lateral surfaces 92 may be in contact with the locking shaft 66. The lateral surfaces 92 of the guide plates 90 may be facing each other. As will be appreciated, the lateral surfaces 92 of the guide plates 90 are configured to prevent movement of locking shaft 66 about the first clevis joint 68 while the connection system 18 is in the disengaged configuration 60. For example, while the connection system 18 is in the disengaged configuration 60, the first clevis joint 68 and the locking shaft 66 may be in a first position 94. While in the first position 94, the first clevis joint 68 may restrict the locking shaft 66 to rotate about a vertical 70 axis of the first clevis joint 68 along a horizontal 72 plane. However, as mentioned above, the lateral surfaces 92 of the pair of guide plates 90 may prevent lateral movement (e.g., along the horizontal 72 plane). In other words, the lateral surfaces 92 may define a channel extending therebetween, such that the lateral surfaces 92 block movement of the locking shaft 66 outside of the channel. In some embodiments, the guide plates 90 may be coupled to any portion of the front 22 of the ride vehicle 14 and/or the first connection mechanism 20 and may include any suitable shape, such that the guide plates 90 are configured to block lateral motion of the locking shaft 66, as discussed above. Accordingly, the first clevis joint 68 being disposed in the first position 94 and the lateral surfaces 92 of the pair of guide plates 90 in combination may prevent substantial movement of the locking shaft 66 while the connection system 18 is in the disengaged configuration 60.

The first connection mechanism 20 may include a locking element 100 disposed at an end of the locking shaft 66 distal to the first clevis joint 68. The locking element 100 is configured to extend into and couple with a locking box 102 of the second connection mechanism 24. The locking box 102 may be any suitable receiving element configured to receive the locking element 100 for locking (e.g., engagement) of the connection system 18. Once inserted into the locking box 102, the locking element 100 may be rotated by the servo motor 62 to engage (e.g., interlock) the locking element 100 with a locking structure 104 of the locking box 102. Particularly, as discussed in further detail below with reference to FIG. 3, the connection system 18 may be in the engaged configuration 61 when the locking element 100 is engaged with the locking structure 104 of the locking box 102.

In the currently illustrated embodiment, the locking element 100 is a rectangular prism (e.g., an elongate structure) having at least a first outer surface 110 and a second outer surface 112. The first outer surface 110 may be substantially flat and may define a distal surface of the locking shaft 66. The second outer surface 112 is disposed opposite to the first outer surface 110 relative to the rectangular prism shape of the locking element 100, as shown, and may also be substantially flat. Indeed, the first outer surface 110 may be substantially parallel to the second outer surface 112 and may be spaced apart from the second outer surface 112 by a width 113 of the locking element 100.

The locking element 100 may be configured to be translated through a locking aperture 115 of the locking box 102 and rotated 74 (e.g., approximately ninety degrees) to engage with the locking structure 104. To this end, the locking structure 104 of the locking box 102 may include a first inner surface 114 and a second inner surface 116. The first inner surface 114 and the second inner surface 116 may both be substantially flat and face each other. The first inner surface 114 may also be disposed substantially parallel to the second inner surface 116. The first inner surface 114 may also be disposed a distance 118 from the second inner surface 116. The distance 118 may be substantially equal to, or slightly less than, the width 113 of the locking element 100. Indeed, in some embodiments, the locking element 100 may be configured to elastically deform (e.g., temporarily flex or compress) to engage with the locking structure 104. In this manner, when the locking element 100 is inserted into the locking box 102 and rotated 74, the first outer surface 110 and the second outer surface 112 of the locking element 100 may directly contact the first inner surface 114 and the second inner surface 116, respectively, of the locking structure 104. In other words, the locking element 100 may couple to the locking structure 104 via a friction fit or compression fit. In some embodiments, the first outer surface 110 and/or the second outer surface 112 may include a material having a high coefficient of friction, such as rubber pads 119. Further, in some embodiments, the first outer surface 110 and the second outer surface 112 may include any suitable contours (e.g., convex and/or concave) corresponding to similar corresponding contours of the first inner surface 114 and the second inner surface 116 to provide the engagement therebetween, as discussed above.

Figure 4:
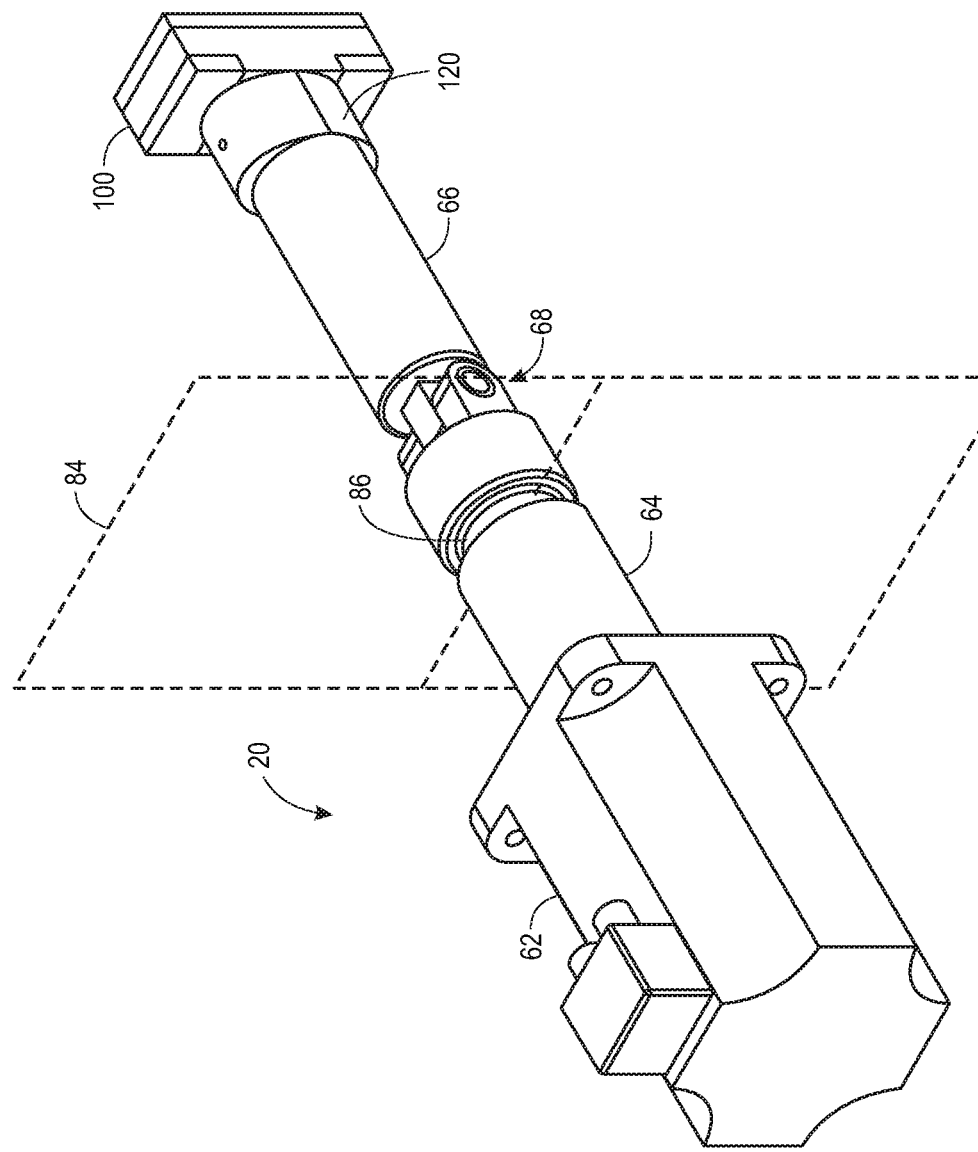
FIG. 4 is a perspective view of a connection mechanism of the ride system of FIG. 1, in accordance with the present disclosure.

Further, as shown and discussed with further detail in reference to FIG.4, the locking shaft 66 may include an annular wedge 120 disposed about the locking shaft 66 adjacent to the locking element 100. The annular wedge 120 is disposed annularly (e.g., circumferentially) about the locking shaft 66 and is asymmetrically shaped to provide a friction fit interface (e.g., compression fit) between the annular wedge 120 and the locking aperture 115 (e.g., and/or the locking structure 104) when the locking element 100 is inserted into the locking box 102 and the locking shaft 66 is rotated 74. Particularly, the annular wedge 120 may be asymmetrically shaped about a longitudinal axis of the locking shaft 66.

Further, although the locking element 100 and the locking structure 104 are discussed herein having particular coupling elements, it should be understood that the locking element 100 and the locking structure 104 may include any suitable corresponding structure to enable locking via rotation 74. For example, in some embodiments, the locking element 100 and/or the locking structure 104 may include spiral-shaped grooves, threads, rotational couplings, bayonet connections, snap connections, latches, a twist locking connection, or a combination thereof. In some embodiments, the locking element 100 and/or the locking structure 104 may be configured to couple together via relative translation of the locking element 100 and/or the locking structure 104, such as via a snap-fit mechanism.

The second connection mechanism 24 includes the locking box 102, a second clevis joint 122 (e.g., a hinge, a yaw joint), a roll shaft 124 (e.g., a roll joint), and a rear mounting element 126 (e.g., a roll shaft support). The locking box 102 may be coupled to the roll shaft 124 via the second clevis joint 122. For example, the second clevis joint 122 may include a fork 130 extending from the roll shaft 124, an extension 132 extending from the locking box 102, and a shaft 134 extending through the fork 130 and the extension 132, as shown. The rear mounting element 126 may be mounted to the rear 26 of one of the ride vehicles 14. The roll shaft 124 may be coupled to the rear mounting element 126 and is configured to rotate within the rear mounting element about a longitudinal axis 128 of the roll shaft 124.

The second connection mechanism 24 may further include a first actuator 140 and a second actuator 142. The first and second actuators 140 may be any suitable linear actuators configured to provide the functions discussed herein, such as electromechanical actuators and/or a hydraulic actuators. The first and second actuators 140, 142 may be mounted to any suitable surface of the rear 26 of the ride vehicle 14. As shown, the first actuator 140 includes a first locking implement 144 (e.g., a locking element) extending from the first actuator 140 toward a back surface 146 of the locking box 102. The first locking implement 144 is configured to engage with the locking box 102 to block rotation of the locking box 102 about the second clevis joint 122. Particularly, the first locking implement 144 (e.g., the locking element) may include an elongate structure extending transverse to an axis of rotation of the second clevis joint 122 such that engagement of the first locking implement 144 with the back surface 146 of the locking box 102 blocks rotation of the locking box 102 about the axis of rotation.

Similarly, the second actuator 142 includes a second locking implement 148 (e.g., an engager, a locking element) extending from the second actuator 142 toward the roll shaft 124. The second locking implement 148 is configured to engage with the roll shaft 124 to prevent rotation of the roll shaft 124 about its longitudinal axis 128. In some embodiments, the first and second locking implements 144, 148 may be engaged to prevent movement of the locking box 102 and the roll shaft 124 while the connection system 18 is in the disengaged configuration 60, and may be disengaged to allow movement of the locking box 102 and the roll shaft 124 while the connection system 18 is in the engaged configuration 61 (FIG. 3).

In the currently illustrated embodiment, the first locking implement 144 includes a locking surface 150 configured to contact (e.g., engage) the back surface 146 of the locking box 102 to prevent movement of the locking box 102 about the second clevis joint 122. As shown, the locking surface 150 may be elongated and substantially flat to engage with the back surface 146, which is also substantially flat. In some embodiments, the first locking implement 144 may include any suitable locking feature configured to engage with any suitable corresponding feature of the locking box 102 to prevent movement of the locking box 102 about the second clevis joint 122. In some embodiments, the locking surface 150 may include a material having a high coefficient of friction, such as the rubber pad 119.

Further, in the currently illustrated embodiment, the second locking implement 148 includes one or more pins 154 and the roll shaft 124 may include one or more corresponding receptacles 156 (e.g., holes or eyelets) through flanges 157 (e.g., extensions). As shown, the receptacles 156 extend through the flanges 157, which may be integrally coupled to the roll shaft 124. The second actuator 142 is configured to extend the second locking implement 148 such that the one or more pins 154 extend into the one or more receptacles 156, as shown. Extension of the one or more pins 154 into the one or more receptacles 156 prevents rotation of the roll shaft 124 about its longitudinal axis 128. Similarly, the second actuator 142 may retract the second locking implement 148 to allow rotation of the roll shaft 124. In some embodiments, the second locking implement 148 may include any suitable locking mechanism configured to engage with a corresponding locking element of the roll shaft 124 to prevent rotation of the roll shaft 124 about its longitudinal axis 128. In some embodiments, the first and second actuators 140, 142 may be any suitable actuators configured to linearly actuate the first and second locking implements 144, 148, respectively, based on one or more signals received from the controller 50.

Figure 3:
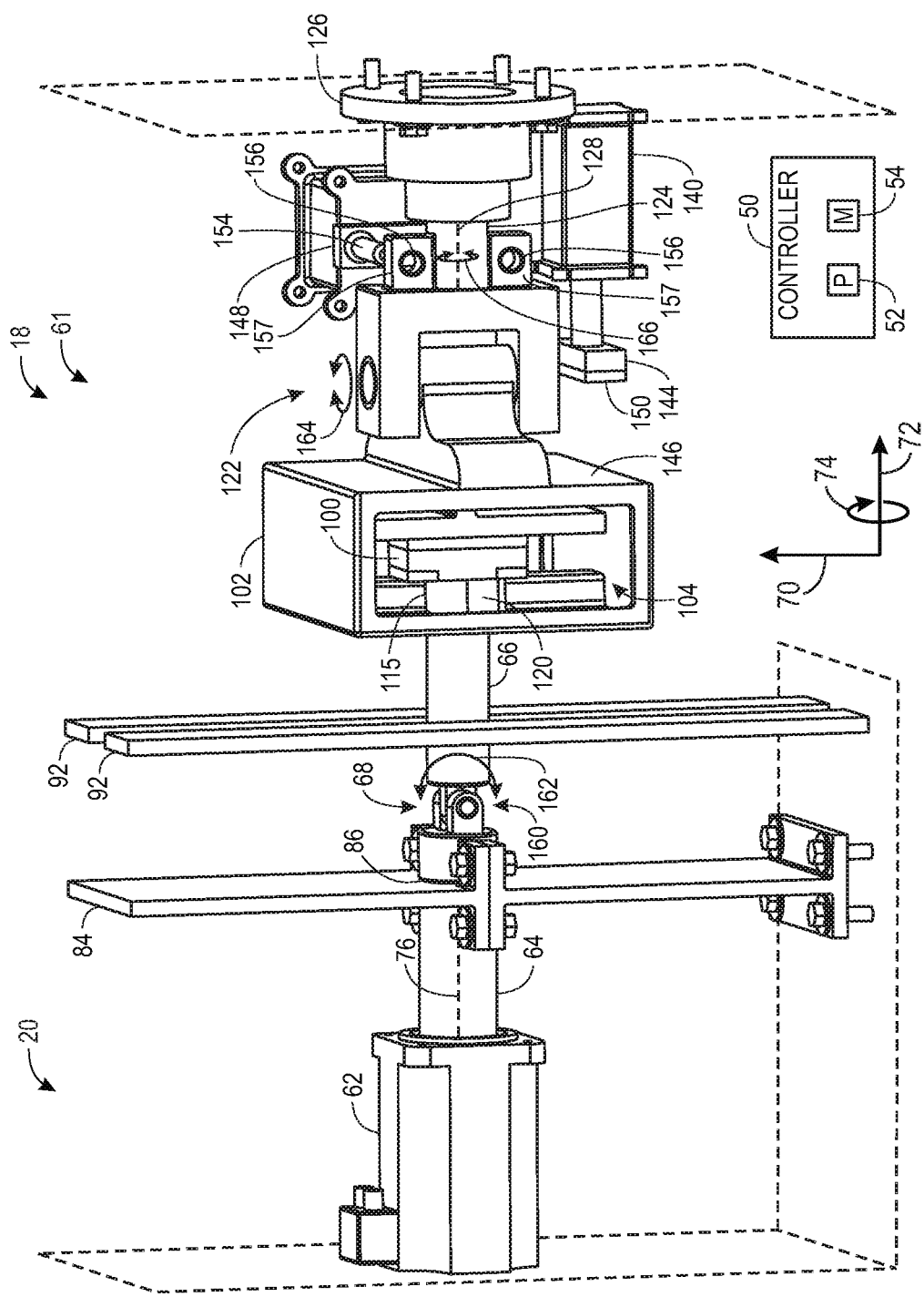
FIG. 3 is a perspective view of an embodiment of a connection system of the ride system of FIG. 1, in accordance with the present disclosure.

FIG. 3 is a perspective view of the connection system 18 in the engaged configuration 61. As shown, while the connection system 18 is in the engaged configuration 61, the first connection mechanism 20 and the second connection mechanism 24 may be engaged (e.g., coupled) to each other. For example, as shown, the locking element 100 of the locking shaft 66 may be engaged with the locking structure 104 of the locking box 102. Further, while the connection system 18 is in the engaged configuration 61, the first clevis joint 68 may be configured to allow relative pitching between the ride vehicles 14, the second clevis joint 122 may be configured to allow relative yawing between the ride vehicles 14, and the roll shaft 124 may be configured to allow relative rolling between the ride vehicles 14.

Generally, to transition the connection system 18 from the disengaged configuration 60 (FIG. 2) to the engaged configuration 61, the first connection mechanism 20 of one of the ride vehicles 14 may be translated toward the second connection mechanism 24 of an adjacent ride vehicle 14, and/or vice versa. In some embodiments, the locking element 100 of the locking shaft 66 may be inserted into the locking box 102 through the locking aperture 115 during a transition from the disengaged configuration 60 to the engaged configuration 61. Once the locking element 100 is in a locking position (e.g., within the locking box 102), the servo motor 62 may rotate the locking shaft 66 to cause engagement between the locking element 100 and the locking box 102.

Rotation of the locking shaft 66 may similarly cause rotation of the first clevis joint 68 from the first position 94 (FIG. 2) to a second position 160. In some embodiments, the first position 94 may further be defined by the position of the servo motor shaft 64, the locking shaft 66, and/or the locking element 100, as shown in FIG. 2. Similarly, the second position 160 may further be defined by the position of the servo motor shaft 64, the locking shaft 66, and/or the locking element 100, as shown in FIG. 3. While in the second position 160, the first clevis joint 68 may enable the locking shaft 66 to rotate about the first clevis joint 68 along a vertical 70 plane. In other words, when the first clevis joint 68 is in the second position 160, the locking shaft 66 may be configured to rotate about the first clevis joint 68 in a first rotational direction 162 (e.g., pitch). Indeed, the locking shaft 66 may rotate in the first rotational direction 162 along the lateral surfaces 92 of the guide plates 90.

Further, while in the engaged configuration 61, the first locking implement 144 may be disengaged from the locking box 102. Particularly, in some embodiments, the first actuator 140 may retract the first locking implement 144 away from the locking box 102 to disengage the locking surface 150 of the first locking implement 144 from the back surface 146 of the locking box 102. When the first locking implement 144 is disengaged from the locking box 102, the locking box 102 may be configured to rotate about the second clevis joint 122 in a second rotational direction 164 (e.g., yaw). In some embodiments, the second rotational direction 164 may be disposed within a horizontal 72 plane.

Further, while in the engaged configuration 61, the second locking implement 148 may be disengaged from the roll shaft 124. Particularly, in some embodiments, the second actuator 142 may retract the second locking implement 148 away from the roll shaft 124 to disengage the pins 154 of the second locking implement 148 from the receptacles 156 of the roll shaft 124. When the second locking implement 148 is disengaged from the roll shaft 124, the roll shaft 124 may be configured to rotate about its longitudinal axis 128 in a third rotational direction 166 (e.g., roll).

During a transition from the disengaged configuration 60 (FIG. 2) to the engaged configuration 61 (FIG. 3), the servo motor shaft 64 may be configured to rotate 74 relative to the support structure 84 while the servo motor shaft 64 is supported by the support structure 84 via the annular support guide 86. Further, during the transition from the disengaged configuration 60 to the engaged configuration 61, the annular wedge 120 is configured to provide a friction or compression fit between the annular wedge 120 and the locking structure 104.

To better illustrate, FIG. 4 is a perspective view of the first connection mechanism 20. As discussed herein, the first connection mechanism 20 may include the servo motor 62, the servo motor shaft 64, the first clevis joint 68, the locking shaft 66, the annular wedge 120, and the locking element 100.

As shown, the annular support guide 86 may include a channel disposed annularly about an outer surface of the servo motor shaft 64. Further, as mentioned above, the support structure 84 may be coupled to the annular support guide 86. In this manner, the support structure 84 may provide support to the servo motor shaft 64, such as to prevent wear on the servo motor 62. Indeed, during standard operation of the ride system 10, the servo motor shaft 64 may experience relatively high forces, such as when the connection system 18 is engaged and the ride vehicles 14 are moving along the path 16. As such, the support structure 84 is coupled to the servo motor shaft 64 to absorb forces experienced by the servo motor shaft 64 and to minimize an amount of forces that are transferred to the servo motor 62.

The annular wedge 120 may be disposed annularly about the locking shaft 66 adjacent to the locking element 100. The annular wedge 120 may further be asymmetrically shaped (e.g., asymmetric in the circumferential direction about the locking shaft 66) such that the annular wedge 120 may include varied thicknesses at different radial locations about the locking shaft 66. In this manner, when the locking shaft 66 is inserted into the locking aperture 115 of the locking box 102 (FIG. 2) and locking shaft 66 is rotated, thicker portions of the annular wedge 120 may provide a friction fit with portions (e.g., the locking aperture 115) of the locking box 102.

Figure 5:
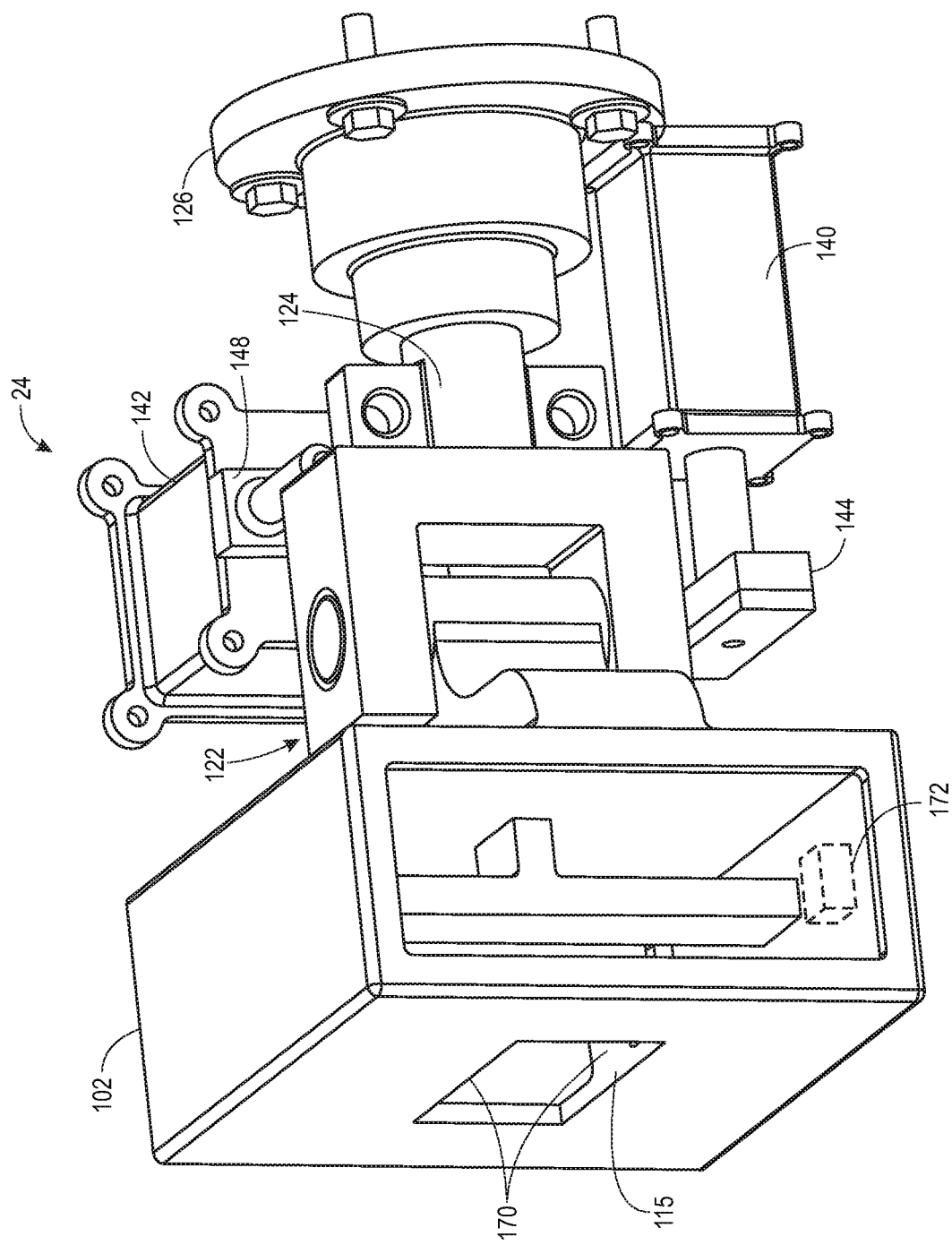
FIG. 5 is a perspective view of a connection mechanism of the ride system of FIG. 1, in accordance with the present disclosure.

To further illustrate, FIG. 5 is a perspective view of the second connection mechanism 24. As discussed herein, the second connection mechanism 24 may include the locking box 102, the second clevis joint 122, the roll shaft 124, the rear mounting element 126, the first actuator 140, the second actuator 142, the first locking implement 144, and the second locking implement 148.

As shown, the locking box 102 may also include the locking aperture 115. As mentioned above, the locking element 100 (FIG. 4) is configured to be inserted through the locking aperture 115. Once the locking element 100 passes through the locking aperture 115 into the locking box 102, the locking shaft 66 may be rotated to cause the locking element 100 to engage with the locking structure 104 of the locking box 102 and to cause the annular wedge 120 to engage with a boundary (e.g., an edge or a perimeter) of the locking aperture 115. More specifically, thicker portions of the annular wedge 120, as shown in FIG. 4, may engage with opposing surfaces 170 of the locking aperture 115.

In some embodiments, the locking box 102 may provide housing for control circuitry 172 (e.g., a controller). As discussed in further detail below, the control circuitry 172 may be configured to ensure engagement between the first and second connection mechanisms 20, 24 of the connection system 18. For example, the control circuitry 172 may be in communication with one or more proximity sensors, pressure sensors, or the like, configured to detect engagement between the first and second connection mechanisms 20, 24.

Figure 6:
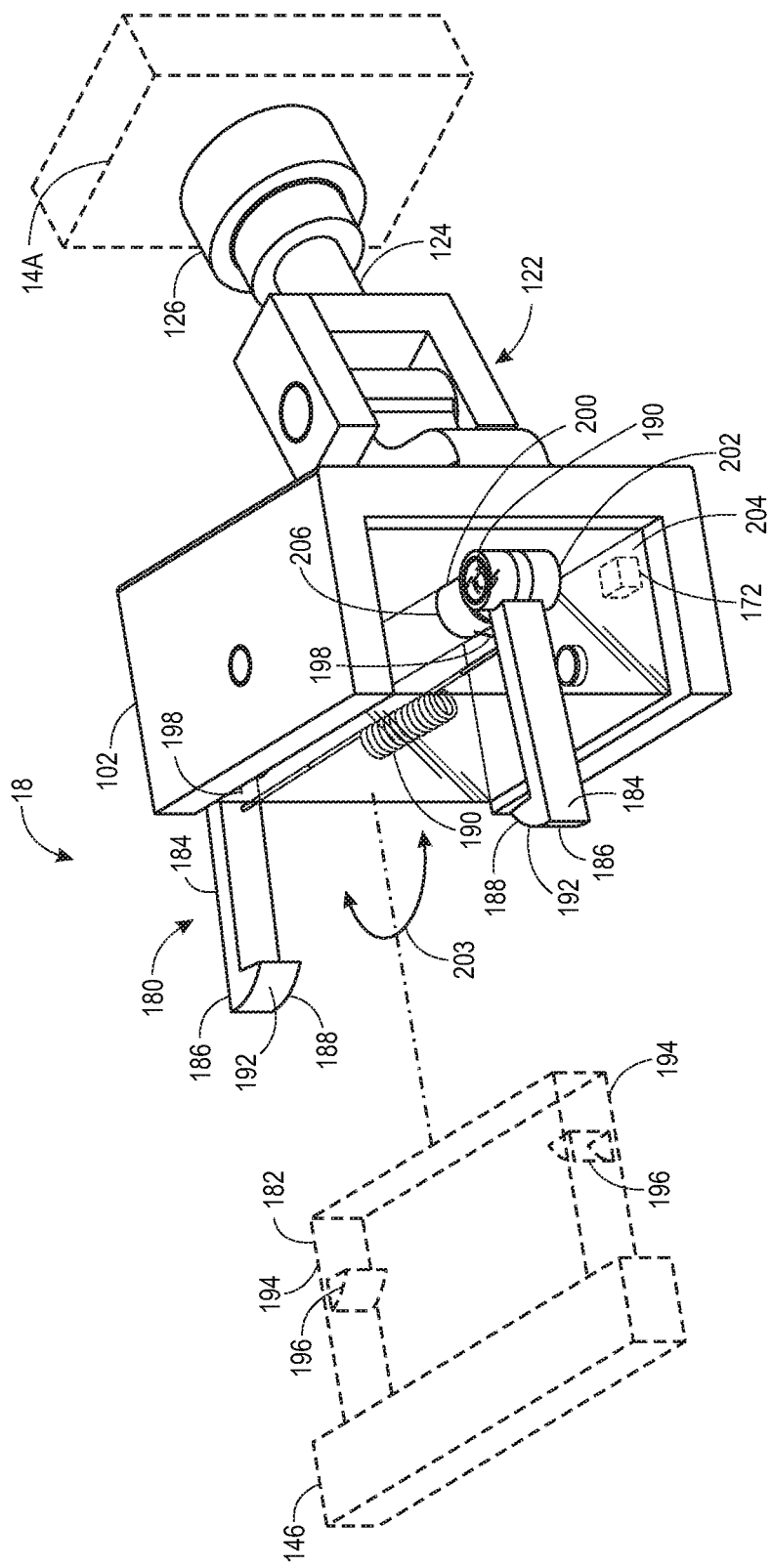
FIG. 6 is a perspective view of an embodiment of a connection system of the ride attraction of FIG. 1, in accordance with the present disclosure.

FIG. 6 is a perspective view of an embodiment of the connection system 18. In the currently illustrated embodiment, the connection system 18 includes the rear mounting element 126, the roll shaft 124, the second clevis joint 122, the locking box 102, and an engagement device 180. The rear mounting element 126 of the connection system 18 may be mounted to a first ride vehicle 14a. The engagement device 180 is configured to engage with an engagement element 182 of a second ride vehicle 14b. As shown, the engagement device 180 may include a pair of arms 184 having respective coupling features 186 disposed at ends of the arms 184. As shown, the coupling features 186 may include hooks 188. The coupling features 186 are configured to couple to and engage with the engagement element 182 of the second ride vehicle 14b. For example, in some embodiments, the engagement device may include one or more springs 190, such as torsional springs, compression springs, and/or tension springs. The springs 190 may be coupled to each of the arms 184 to allow the arms 184 to couple to the engagement element 182. Particularly, the springs 190 may be configured to bias the arms 184 toward each other. In this manner, the connection system 18 may passively engage with the engagement element 182. To illustrate, in certain embodiments, the hooks 188 may include angled surfaces 192 (e.g., slanted and/or rounded surfaces). As the first and second ride vehicles 14a, 14b are translated toward each other, the angled surfaces 192 of the hooks 188 may contact edges 194 of the engagement element 182, thereby forcing the hooks 188 outward, or away from each other. The hooks 188 may slide along the edges 194 until the hooks 188 reach receiving slots 196. When the hooks 188 reach the receiving slots 196, the springs 190 may pull the hooks 188 toward each other into the receiving slots 196. In other words, the hooks 188 may snap into the receiving slots 196. The connection system 18 may further include a disengagement mechanism 198 configured to withdraw the arms 184 from the receiving slots 196 to decouple the connection system 18 from the engagement element 182. The disengagement mechanism 198 may include any suitable elements configured to overcome a force of the springs 190. For example, the disengagement mechanism 198 may include a hydraulic actuator, or any other suitable device.

Moreover, as shown, the arms 184 may be mounted to a central beam 200 via hinges 202. The arms 184 may be configured to rotate about the hinges 202 while coupling to and decoupling from the engagement element 182, as discussed above. Further, the central beam 200 may be configured to rotate about its longitudinal axis to allow the arms 184 to pitch 203. The central beam 200 may be housed within the locking box 102. In some embodiments, the locking box 102 may include a barrier 204 configured to block contaminants (e.g., debris) from entering the locking box 102. Indeed, in some embodiments, as discussed above, the locking box 102 may provide housing to the control circuitry 172. In some embodiments, as shown, the barrier 204 may include apertures 206 configured to support ends of the central beam 200. Particularly, the central beam 200 may rotate within the apertures 206 to provide the pitch 203 motion in the arms 184.

Figure 7:
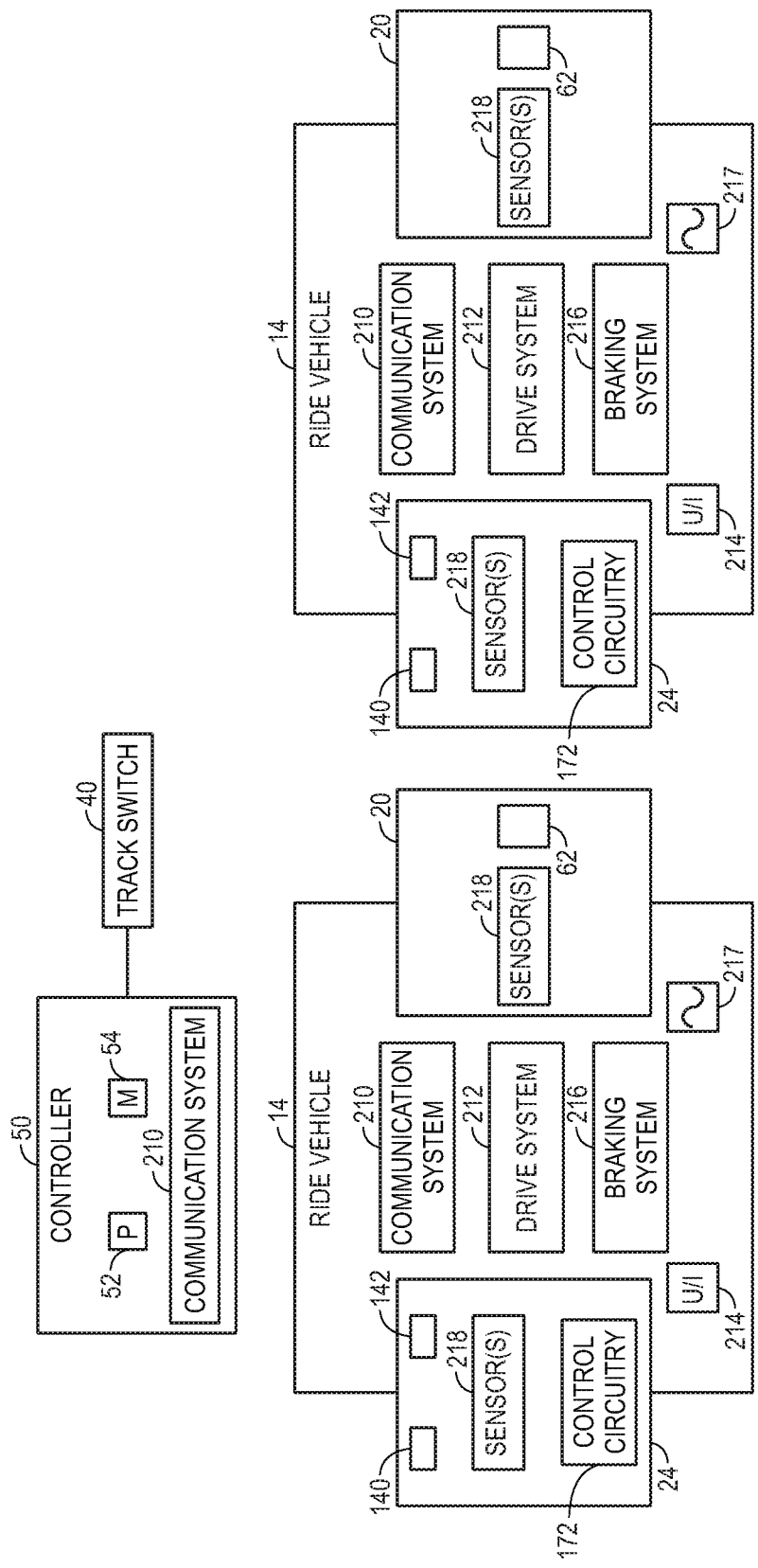
FIG. 7 is a schematic block diagram of an embodiment of the ride system of FIG. 1, in accordance with the present disclosure.

FIG. 7 is a block diagram of an embodiment of the ride system 10. The ride system 10 may include the controller 50 and the ride vehicles 14. Indeed, it should be noted that the ride system 10 has been intentionally simplified to focus on certain aspects. That is, it should be understood that the ride system 10 may include additional elements discussed herein that are not illustrated in the current embodiment.

Each ride vehicle 14 may include the first connection mechanism 20, the second connection mechanism 24, a communication system 210, a drive system 212, a user interface 214, a braking system 216, a power source 217, or a combination thereof. The first connection mechanism 20 may include the servo motor 62 (e.g., an actuator) and one or more sensors 218. The second connection mechanism 24 may include the first actuator 140, the second actuator 142, the control circuitry 172 and the one or more sensors 218. In some embodiments, the one or more sensors 218 may be included in the servo motor 62, the first actuator 140, and the second actuator 142 and configured to detect the respective actuated displacements of the servo motor 62, the first actuator 140, and the second actuator 142.

As discussed above, the second connection mechanism 24 of one ride vehicle 14 is configured to engage with the first connection mechanism 20 of another ride vehicle 14. To this end, the one or more sensors 218 may be proximity sensors, such as fiber optic sensors, acoustic sensors, infrared sensors, or any other suitable type of sensor configured to provide the functionality of the sensors 218 as described herein. The one or more sensors 218 are configured to gather data, such as data indicative a distance between adjacent ride vehicles 14, orientation of the servo motor shaft 64 (FIG. 3), engagement between the first and second connection mechanisms 20, 24 of the adjacent ride vehicles 14, and so forth. The one or more sensors 218 may send one or more signals indicative of the gathered data to the control circuitry 172 and/or the controller 50 via the communication system 210. Indeed, in some embodiments, each ride vehicle 14 may include respective control circuitries 172. In some embodiments, the controller 50 may communicate with each ride vehicle 14 via the respective control circuitry 172 of each ride vehicle 14. Accordingly, various processes discussed herein may be implemented via the control circuitry 172 and/or the controller 50. As such, while discussions herein may focus on processes implemented by the controller 50, it should be understood that such processes may be implemented via the controller 50 and/or via the control circuitry 172.

The communication system 210 is configured to provide communication between the controller 50, the sensors 218, the control circuitry 172, the servo motor 62, the first actuator 140, the second actuator 142, the drive system 212, the user interface 214, the braking system 216, and the track switch 40. The communication system 210 may provide such communication via a wireless network, such as wireless local area networks [WLAN], wireless wide area networks [WWAN], near field communication [NFC], Wi-Fi, and/or Bluetooth. In some embodiments, the communication system 210 may communicate through a wired network such as local area networks [LAN], or wide area networks [WAN].

The drive system 212 may be any suitable drive system configured to propel the ride vehicle 14 along the path 16 (FIG. 1). In some embodiments, the drive system 212 may be included in the path 16 and/or the ride vehicle 14. Conversely the braking system 216 may be any suitable braking system configured to provide braking to the ride vehicle 14 along the path 16. In some embodiments, the braking system 216 may be included in the path 16 and/or the ride vehicle 14.

Generally, as mentioned above, adjacent ride vehicles 14 are configured to approach each other while the connection system 18 is in the disengaged configuration 60 (FIG. 2). The one or more sensors 218 disposed in the first connection mechanism 20 and/or the second connection mechanism 24 are configured to detect a distance between the adjacent ride vehicles 14 as the ride vehicles 14 approach each other. The sensors 218 are configured to communicate the distance (e.g., via one or more signals transmitted by the communication system 210) to the controller 50. Based on the distance, the controller 50 may activate the braking system 216 and/or the drive system 212 to bring the adjacent ride vehicles 14 within a predetermined distance of each other. In some embodiments, the predetermined distance may be defined by the first connection mechanism 20 of one ride vehicle 14 being placed in a locking position relative to the second connection mechanism 24 of another ride vehicle 14. The locking position may be a position whereby, upon rotation of the servo motor shaft 64, the connection system 18 may be disposed in the engaged configuration 61 (FIG. 3). More specifically, in some embodiments, the locking position and/or the predetermined distance between the adjacent ride vehicles 14 may be defined by contact of the first outer surface 110 of the locking element 100 with the first inner surface 114 of the locking structure 104, as discussed above in reference to FIGS. 2 and 3.

Once the ride vehicles 14 are disposed at the predetermined distance (e.g., the locking position), the controller 50 may communicate with the servo motor 62 to cause the servo motor 62 to engage the first connection mechanism 20 to the second connection mechanism 24, such as by rotation of the servo motor shaft 64. In other words, the controller 50 may cause the servo motor shaft 64 to transition from the first position 94 (FIG. 2) to the second position 160 (FIG. 3). Further, in some embodiments, the sensors 218 may detect a position of the servo motor shaft 64 (FIG. 2) and/or the locking element 100 (FIG. 2) and communicate the position to the controller 50. For example, in some embodiments, the sensors 218 may detect whether the servo motor shaft 64 and/or the locking element 100 is in the first position 94, as shown in FIG. 2, or in the second position 160, as shown in FIG. 3. Based on the position of the servo motor shaft 64 and/or the locking element 100, as well as the relative distance between the adjacent ride vehicles 14, the controller 50 may determine whether the first connection mechanism 20 is engaged with the second connection mechanism 24. In some embodiments, if the controller 50 determines that the first connection mechanism 20 is engaged with the second connection mechanism 24, the controller 50 may communicate with the first actuator 140 to cause the first actuator 140 to disengage from the locking box 102 (FIG. 2) and communicate with the second actuator 142 to cause the second actuator 142 to disengage from the roll shaft 124 (FIG. 2). In this manner, such as by rotating the servo motor shaft 64 when the servo motor shaft 64 is in the locking position and disengaging the first and second actuators 140, 142, based on the position of the servo motor shaft 64, the controller 50 may cause the connection system 18 to transition from the disengaged configuration 60 (FIG. 2) to the engaged configuration 61 (FIG. 3).

The controller 50 may similarly cause the connection system 18 to transition from the engaged configuration 61 (FIG. 3) to the disengaged configuration 60 (FIG. 2). That is, the controller 50 may send one or more signals to the first and second actuators 140, 142 to cause the first and second actuators 140, 142 to engage with the locking box 102 and the roll shaft 124, respectively. Once the first and second actuators 140, 142 are engaged with the locking box 102 and the roll shaft 124, respectively, the engagement of which may be detected by the sensors 218, the controller 50 may send one or more signals to the servo motor 62 to cause the servo motor 62 to rotate the servo motor shaft 64 to transition from the second position 160 to the first position 94. Indeed, as mentioned above, rotation of the servo motor shaft 64, and more specifically, the locking element 100, may cause disengagement between the first connection mechanism 20 and the second connection mechanism 24.

Further, in some embodiments, the controller 50 may be communicatively coupled to the user interface 214 and/or the track switch 40. The user interface 214 may provide a display and one or more input options to passengers of the ride vehicle 14 relating to a narrative or theme of the ride system 10. For example, in some embodiments, the user interface 214 may allow the passengers to select one of the routes 34 of the secondary portion 32 of the path 16 (FIG. 1). The controller 50 may actuate the track switch 40 to direct the ride vehicle 14 to a certain route 34 based on the input received via the user interface 214.

Figure 8:
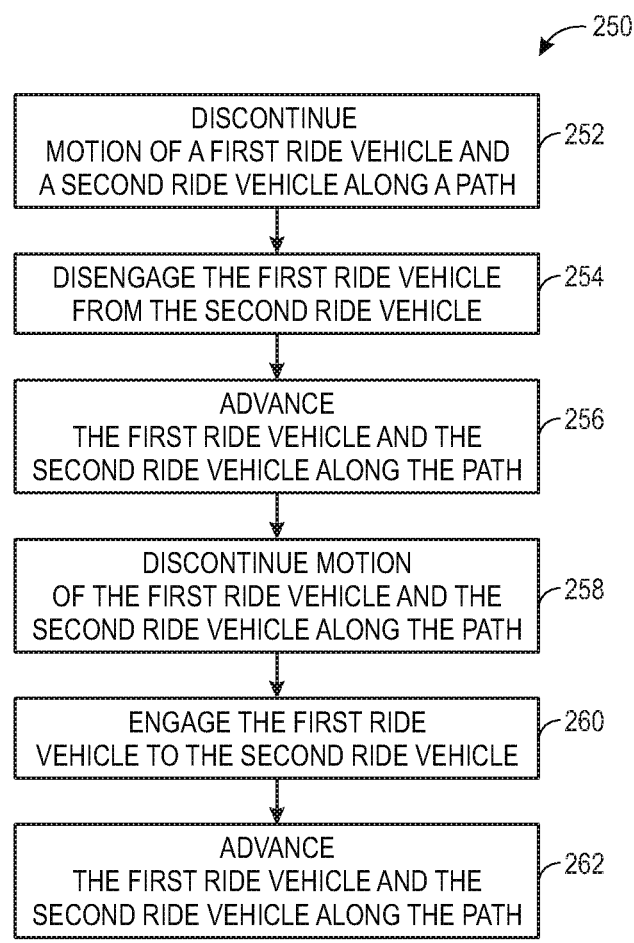
FIG. 8 is a flow chart of an embodiment of an engagement and disengagement process of the ride system of FIG. 1, in accordance with the present disclosure.

FIG. 8 is a flow chart illustrating a disengagement/ engagement process 250 that may be implemented by the controller 50 utilizing one or more components of the ride system 10. Further, while the following discussion focuses on actions of two ride vehicles 14, it should be understood the disengagement/engagement process 250 may be utilized with any suitable number of ride vehicles 14.

At block 252, motion of a first ride vehicle and a second ride vehicle may be discontinued along a path (e.g., the path 16). For example, brakes of the path and/or the first and second ride vehicles may be engaged. Once the first and second ride vehicles have come to a stop, at block 254, the first ride vehicle may be disengaged from the second ride vehicle. Particularly, the first and second ride vehicles may be engaged via a connection system (e.g., the connection system 18). The connection system may include one or more joints (e.g., the first clevis joint 68, the second clevis joint 122, and the roll shaft 124) configured to provide relative motion (e.g., pitch, yaw, roll) between the first and second ride vehicles. In some embodiments, the connection system may include only one joint (e.g., a ball and socket joint, a universal joint) configured to provide relative pitch, roll, and yaw between the first and second ride vehicles. During disengagement of the connection system between the first and second ride vehicles, the one or more joints may be immobilized (e.g., locked). Particularly, the connection system may include one or more actuators (e.g., the servo motor 62, the first actuator 140, the second actuator 142) configured to receive signals and configured to lock and unlock the one or more joints based on the received signals.

Once the first and second ride vehicles have been disengaged, at block 256, the first and second ride vehicle may advance further along the path separately. Indeed, in some embodiments, the first ride vehicle may advance before the second ride vehicle advances. As discussed above, in some embodiments, the first and second ride vehicle may travel along different portions of the path while they are disengaged from each other.

At block 258, motion of the first and second ride vehicles may be discontinued along the path. Particularly, in some embodiments, the first ride vehicle may come to a stop (e.g., via engagement of brakes) and then the second ride vehicle may come to a stop adjacent to the first ride vehicle.

Once the first and second ride vehicles are stopped along the path, at block 260, the first ride vehicle may be engaged with the second ride vehicle. Particularly, the connection system between the first and second ride vehicles may be engaged to couple the first ride vehicle and the second ride vehicle. During engagement of the first and second ride vehicle, the one or more actuators may unlock (e.g., mobilize) the one or more joints to allow relative movement between the first and second ride vehicles. Once the first and second ride vehicles are engaged, at block 262, the first and second ride vehicles may travel further along the path.

Technical effects of the embodiments discussed herein include systems and methods for automated coupling and decoupling of ride vehicles. In this manner, the ride vehicles may be separated and conjoined multiple times during a ride cycle to provide unique riding experiences that may differ between ride cycles. The automated coupling and decoupling of the ride vehicles further allows for ride vehicles needing maintenance to be easily separated from other ride vehicles, thereby increasing an efficiency of maintenance procedures. Further, it should be understood that embodiments discussed herein may be applied to any suitable modular vehicles or cars that may be coupled together in a train format. For example, the embodiments discussed herein may be applied to locomotives (e.g., powered rail vehicles), towing systems, or other industrial applications that may benefit from coupling and decoupling of transport components. Further, as used herein, the term, "ride vehicle," may refer to a vehicle, a car, a train car, an automobile, a passive transport element (e.g., a transport element without an internal drive system), an active transport element (e.g., a transport element with an internal drive system), or a combination thereof. Moreover, it should be understood that features of any of the embodiments discussed herein may be combined with any other embodiments or features discussed herein.

While only certain embodiments have been illustrated and described herein, many modifications and changes will occur to those skilled in the art. It is therefore to be understood that the appended claims are intended to cover all such modifications and changes as fall within the true spirit of the invention.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . " it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A vehicle connection system, comprising:
a first connection mechanism, comprising:
a shaft including a first shaft portion coupled to a second shaft portion by a hinged joint;
a locking element extending from the second shaft portion;
guides extending on opposing sides of the second shaft portion such that a channel is formed between the guides and the guides block movement of the second shaft portion about the hinged joint outside of the channel, wherein the guides are positioned between the locking element and the hinged joint along a length of the shaft; and
a second connection mechanism configured to couple with the first connection mechanism, the second connection mechanism comprising:
a locking box configured to receive the locking element via an aperture in the locking box and configured such that rotation of the locking element while in the locking box via rotation of the shaft interlocks the locking element with the lock box.

2. The vehicle connection system of claim 1, comprising a support structure engaged with the first shaft portion and configured to support the shaft while allowing for rotation of the shaft.

3. The vehicle connection system of claim 1, comprising a servo motor, wherein the first shaft portion comprises a servo motor shaft configured to be rotated by the servo motor about a longitudinal axis of the servo motor shaft.

4. The vehicle connection system of claim 1, wherein the hinged joint comprises a clevis joint.

5. The vehicle connection system of claim 1, comprising an annular wedge coupled to the second shaft portion, wherein the annular wedge is configured to extend partially into the locking box and engage with a boundary of the aperture when rotated relative to the aperture.

6. The vehicle connection system of claim 5, wherein the annular wedge is asymmetric about a longitudinal axis of the second shaft portion.

7. The vehicle connection system of claim 1, wherein the second connection mechanism comprises a roll shaft coupled to the locking box via an additional hinged joint.

8. The vehicle connection system of claim 7, comprising a roll shaft support configured to support the roll shaft while facilitating rotation of the roll shaft about a longitudinal axis of the roll shaft.

9. The vehicle connection system of claim 7, comprising an extension from the roll shaft and an engager configured to be actuated to engage the extension to block rotation of the roll shaft.

10. The vehicle connection system of claim 9, wherein the extension comprises an eyelet and the engager comprises a pin configured to extend through the eyelet.

11. The vehicle connection system of claim 7, comprising an actuator configured to extend an additional locking element into engagement with the locking box to resist rotation of the locking box about the additional hinged joint.

12. The vehicle connection system of claim 11, wherein the additional locking element comprises an elongate structure extending transverse to an axis of rotation of the additional hinged joint such that engagement of the elongate structure with a surface of the locking box blocks rotation about the axis of rotation.

13. The vehicle connection system of claim 11, wherein the actuator comprises a linear electromechanical actuator.

14. A vehicle connection system, comprising:
a first connection mechanism including a locking box configured to engage a first locking element of a second connection mechanism;
a roll shaft of the first connection mechanism coupled to the locking box via a hinged joint, wherein the roll shaft is configured to rotate relative to a roll shaft support configured to support the roll shaft;
an extension from the roll shaft and an engager configured to be actuated to engage the extension to block rotation of the roll shaft; and
an actuator configured to extend a second locking element into engagement with the locking box to resist rotation of the locking box about the hinge joint.

15. The vehicle connection system of claim 14, wherein the extension comprises an eyelet and the engager comprises a pin configured to extend through the eyelet.

16. The vehicle connection system of claim 14, wherein the second locking element comprises an elongate structure extending transverse to an axis of rotation of the hinged joint such that engagement of the elongate structure with a surface of the locking box blocks rotation about the axis of rotation.

17. The vehicle connection system of claim 14, comprising the second connection mechanism, wherein the second connection mechanism comprises the first locking element disposed on a distal end of a shaft.

18. The vehicle connection system of claim 17, wherein the shaft comprises two shaft portions coupled by an additional hinged joint.

19. A system, comprising:
a first vehicle;
a first connector coupled to the first vehicle and comprising a locking element extending from a shaft, wherein a first portion of the shaft is coupled to a second portion of the shaft about a first hinged joint, and wherein the shaft is configured to axially rotate;
a second vehicle; and a second connector coupled to the second vehicle and comprising an engager, a locking box configured to receive the locking element and interlock with the locking element upon rotation of the locking element, a second hinged joint, and a roll shaft coupled to the locking box via the second hinged joint, wherein the roll shaft includes an extension having an eyelet, and wherein the engager is configured to engage the extension via a pin that extends through the eyelet of the extension.

20. The system of claim 19, wherein the first connector comprises guides configured to block rotation about the first hinged joint in a lateral direction, and wherein the second connector comprises a first locking element configured to block rotation of the roll shaft and a second locking element configured to block rotation of the locking box about the second hinged joint.

\* \* \* \* \*